United States Patent
Lev (10) Patent No.: US 11,361,445 B2
(45) Date of Patent: Jun. 14, 2022

(54) IMAGE ANALYSIS FOR DETECTING MASK COMPLIANCE

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 45 days.

(21) Appl. No.: 16/923,132

(22) Filed: Jul. 8, 2020

(65) Prior Publication Data

US 2022/0012894 A1    Jan. 13, 2022

(51) Int. Cl.
*G06T 7/136* (2017.01)
*H04N 5/33* (2006.01)
*G01J 5/00* (2022.01)

(52) U.S. Cl.
CPC ............. *G06T 7/136* (2017.01); *G01J 5/00* (2013.01); *H04N 5/33* (2013.01); *G01J 2005/0077* (2013.01); *G06T 2207/30201* (2013.01)

(58) Field of Classification Search
CPC .. G06T 7/136; G06T 2207/30201; G01J 5/00; G01J 2005/0077; H04N 5/33
See application file for complete search history.

(56) References Cited

U.S. PATENT DOCUMENTS

| | | | |
|---|---|---|---|
| 10,846,857 B1* | 11/2020 | Graves | G06T 7/70 |
| 2015/0106020 A1 | 4/2015 | Chung et al. | |
| 2015/0112606 A1 | 4/2015 | He et al. | |
| 2020/0342245 A1* | 10/2020 | Lubin | G06K 9/0061 |
| 2021/0304537 A1* | 9/2021 | Reed | G01J 5/0025 |
| 2021/0364356 A1* | 11/2021 | Stewart | G01J 5/0025 |
| 2022/0007950 A1 | 1/2022 | Lev et al. | |

OTHER PUBLICATIONS

Official Action dated Dec. 6, 2021 from U.S. Appl. No. 17/007,000. (24 pages).

* cited by examiner

*Primary Examiner* — Hugh Maupin (57) ABSTRACT

There is provided a computer implemented method for analyzing a thermal image for enforcing mask wearing compliance, comprising: receiving a thermal image of a subject captured by a sensor, analyzing the thermal image to identify an indication of estimated temperature of a region of a face of the subject, in response to the estimated temperature being below a temperature threshold, detecting lack of mask wearing compliance, and generating instructions for meeting proper mask wearing compliance.

19 Claims, 4 Drawing Sheets

IMAGE ANALYSIS FOR DETECTING MASK COMPLIANCE

FIELD AND BACKGROUND OF THE INVENTION

The present invention, in some embodiments thereof, relates to image analysis and, more specifically, but not exclusively, to systems and methods for analyzing images for detection of mask compliance.

Viral disease outbreaks, such as COVID-19, have prompted a wide range of precautions to reduce or prevent spread of the viral disease while people continue to perform routine tasks. Wearing of masks has been shown to both reduce risk of a person infected with the viral disease from spreading the viral disease to other people, and reduce risk of a person that is not infected with the viral disease from being infected with the viral disease by other people.

SUMMARY OF THE INVENTION

According to a first aspect, a computer implemented method for analyzing a thermal image for enforcing mask wearing compliance, comprises: receiving a thermal image of a subject captured by a sensor, analyzing the thermal image to identify an indication of estimated temperature of a region of a face of the subject, in response to the estimated temperature being below a temperature threshold, detecting lack of mask wearing compliance, and generating instructions for meeting proper mask wearing compliance.

According to a second aspect, a computer implemented method for automatic training of a classifier for determining mask wearing compliance based on a thermal image, comprises: obtaining, for each of a plurality of subjects, a sequence of thermal images of the respective subject wearing a mask, obtained over a time interval, for each sequence of thermal images, analyzing the respective sequence of thermal images to identify a threshold thermal image of the sequence, where in thermal images prior to the threshold thermal image an indication of an estimated temperature of a region of a face of the respective subject is increasing, and in thermal images after the threshold thermal image the indication of the estimated temperature of the region of the face of the respective subject reached a maximal value and remained constant thereafter, labelling thermal images of the sequence prior to the threshold thermal image with a label denoting lack of mask wearing compliance, and labelling thermal images of the sequence after the threshold thermal image with a label denoting proper mask wearing compliance, creating a training dataset including, for each of the plurality of subjects, the sequence of thermal images with corresponding labels denoting lack of mask wearing compliance or proper mask wearing compliance, and training a classifier using the training dataset.

In a further implementation form of the first aspect, analyzing the thermal image to identify the estimated temperature comprises obtaining an aggregated intensity level of pixels depicting the region of the face.

In a further implementation form of the first aspect, the aggregated intensity level is computed as an average of intensity of pixels depicting the region of the face, and the temperature threshold comprises a pixel intensity level threshold.

In a further implementation form of the first aspect, analyzing the thermal image to identify the estimated temperature comprises comparing an aggregated intensity level of pixels depicting the region of the face to a reference region of the face, and the temperature threshold is defined by the aggregated intensity level of pixels depicting the reference region of the face.

In a further implementation form of the first aspect, the region of the face comprises the nose or portion thereof and the reference region of the face comprises an upper region of the face or portion thereof.

In a further implementation form of the first aspect, analyzing the thermal image comprises: analyzing the thermal image to identify at least one mask parameter, wherein the estimated temperature of the region of the face is determined according to an thermal image analysis process selected from a plurality of thermal image analysis processes based on the identified at least one mask parameter.

In a further implementation form of the first aspect, at least one mask parameter is selected from the group consisting of: surgical mask, N95 mask, face shield, scarf, and cloth mask, mask thickness, presence of mask valves.

In a further implementation form of the first aspect, analyzing the thermal image comprises segmenting the region of the face of the subject from the thermal image, and identify comprises identifying the estimated temperature from the segmented region.

In a further implementation form of the first aspect, the thermal image is one of a sequence of thermal images, wherein each thermal image of the sequence of thermal images is analyzed to identify a respective indication of estimated temperature, and further comprising: analyzing a plurality of indications of estimated temperature of the sequence of thermal images to detect an increasing trend in the estimated temperature, extrapolating the increasing trend, analyzing the extrapolated increasing trend for predicting that the increasing trend will increase above the temperature threshold, and wherein generating instructions comprises generating instructions for maintaining wearing the mask for meeting mask wearing compliance.

In a further implementation form of the first aspect, the thermal image is one of a sequence of thermal images, wherein each thermal image of the sequence of thermal images is analyzed to identify a respective indication of estimated temperature, and further comprising: analyzing a plurality of indications of estimated temperature of the sequence of thermal images to detect an increasing trend in the estimated temperature, extrapolating the increasing trend, analyzing the extrapolated increasing trend for predicting that the increasing trend will remain below the temperature threshold, and wherein generating instructions comprises generating instructions for adjusting the mask for meeting mask wearing compliance.

In a further implementation form of the first aspect, analyzing comprises inputting the thermal image into a classifier, wherein the detecting lack of mask wearing compliance is an outcome of the classifier, wherein the classifier is trained on a training dataset including, for each of a plurality of subjects, at least one thermal image of the respective subject wearing a mask, and a corresponding label denoting proper mask wearing compliance or lack of mask wearing compliance.

In a further implementation form of the first aspect, the label denoting proper mask wearing compliance or lack of mask wearing compliance is automatically assigned by: analyzing a sequence of thermal images of the respective subject obtained over a time interval, analyzing the sequence of thermal images to determine a pattern of the indication of estimated temperature of the region of the face of the subject increasing, followed by a plateau at a maximal estimated temperature, identifying a threshold thermal image of the sequence, where in thermal images prior to the threshold thermal image the estimated temperature is increasing, and in thermal images after the threshold thermal image the estimated temperature reached a maximal value and remained constant thereafter, labelling thermal images of the sequence prior to the threshold thermal image with a label denoting lack of mask wearing compliance, and labelling thermal images of the sequence after the threshold thermal image with a label denoting proper mask wearing compliance.

In a further implementation form of the first aspect, the training dataset includes thermal images depicting a plurality of subjects wearing a plurality of masks having a plurality of mask parameters.

In a further implementation form of the first aspect, further comprising estimating an amount of time the subject wore the mask according to the indication of estimated temperature, and when the lack of mask wearing compliance is detected, generating instructions comprises generating instructions indicating that the mask has been work for the estimated amount of time and should be kept on constantly.

In a further implementation form of the first aspect, the estimated amount of time is computed based on calibration code that maps the indication of estimated temperature to estimated amount of time from initial wearing of the mask, the calibration code trained according to a sequence of thermal images of at least one subject wearing a mask, each thermal image associated with a timestamp indicating time from initial wearing of the mask and associated indication of estimated temperature.

In a further implementation form of the first aspect, generating instructions comprises at least one of: (i) playing a video on a display showing show to properly put on and wear a mask for mask wearing compliance (ii) an audio message playing over speakers stating that the mask is to be worn on the nose and mouth, (iii) a pop-up message presented on a display indicating that the mask is to be worn on the nose and mouth, and (iv) instructions to a controller of an automated door to keep the door closed to prevent entry until mask wearing compliance is met, when mask compliance is met the instructions to the controller are to automatically open the door to allow entry.

In a further implementation form of the first aspect, analyzing the thermal image comprises identifying at least one thermochromic element on the mask, identifying at least one thermochromic parameter of the thermochromic element, and identifying the indication of estimated temperature according to the at least one thermochromic parameter.

In a further implementation form of the second aspect, each respective thermal image is analyzed using analysis code that segments the region of the face of the respective subject depicted in the respective thermal image, and computes the indication of the estimated temperature as an aggregation of pixel intensity values of pixels within the segmented region.

In a further implementation form of the second aspect, the threshold thermal image is identified according to the indication of the estimated temperature of the region of the face of the respective subject being equal to an indication of the estimated temperature of a reference region of the face of the respective subject, wherein in thermal images prior to the threshold thermal image the indication of the estimated temperature of the region of the face of the respective subject is below the reference region, and in thermal images after the threshold thermal image the indication of the estimated temperature of the region of the face of the respective subject is equal to or greater than the reference region.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to image analysis and, more specifically, but not exclusively, to systems and methods for analyzing images for detection of mask compliance.

As used herein, the term image and the term thermal image may sometimes be interchanged. The term thermal image may refer to an image with an indication of different temperatures, for example, captured by a thermal sensor and/or captured with a non-thermal sensor that depicts thermochromic elements therein.

An aspect of some embodiments of the present invention relates to systems, methods, an apparatus, and/or code instructions (e.g., stored in a memory and executable by at least one hardware processor) for analyzing thermal image (s) depicting a subject wearing a mask for detecting whether the subject is properly wearing a mask (also referred to herein as proper and/or meeting mask wearing compliance) such as by wearing the mask over the mouth and nose, or incorrectly wearing a mask and/or not wearing a mask (also referred to herein as lack of mask wearing compliance) such as wearing the mask below the nose and/or below the chin. The thermal image(s) are captured by a sensor. The thermal image is analyzed to identify an indication of estimated temperature of a region of a face of the subject, for example, the temperature of the nose, tip region of the nose, upper cheeks below the eyes, sides of the mask, and/or lower portion of the mask. It is noted that the region of the face may be located underneath the mask, and/or the region of the face may be defined by the mask itself. The temperature may be estimated by computing an aggregated intensity level of the pixels depicting the region of the face, for example, an average value of the intensity value of the pixels depicting the region of the face. The estimated temperature may be analyzed, for example, compared to a temperature threshold. The temperature threshold denotes a target temperature which is predicted to be reached after the mask has been properly worn for a sufficiently long time interval so that the region of the face heats up from the subject's breathing behind the mask. Proper mask wearing compliance may be determined when the estimated temperature is above the temperature threshold, indicating for example, that the mask has been worn properly for a sufficiently long amount of time. Lack of mask wearing compliance may determine when the estimated temperature is below the temperature threshold, indicating for example, that the mask is not being worn properly, and/or is worn properly but for short amount of time such as the subject repeatedly adjusting the mask and/or removing and replacing the mask. Instructions may be generated accordingly, for example, when lack of mask wearing compliance is detected, the instructions may be to present a visual message on a display (e.g., video, still image) and/or play an audio message over a speaker, for example, asking the subject to put the mask on properly and keep the mask on.

In some embodiments, the temperature threshold is set according to a temperature of a reference region of the face of the subject depicted in the thermal image that is uncovered by the mask, for example, the temperature measured using the thermal image for one or more or combination (e.g., average) of the forehead, the eye canthus, and/or upper cheek. The temperate threshold may be set based on a tolerance value of the reference region. For example, when the temperature of the reference region is 36.5 degrees Celsius, the temperature threshold may be adjusted to a tolerance value, for example, set to 0.5 degrees Celsius below the reference region, i.e., 36 degrees Celsius. The estimated temperature of the region of the face of the subject (e.g., nose tip region), when properly covered for the past few minutes at least, should be equal to or exceed the threshold set based on the reference temperature of 36 degrees Celsius. In another example, when the temperature of the forehead used as the reference region is 35.5 degrees Celsius, and the temperature threshold is set to 35.0 degrees Celsius (i.e., tolerance value of 0.5 degrees) proper mask wearing may be detected when the temperature of the region (e.g., nose tip region) is at least 35.0 degrees.

An aspect of some embodiments of the present invention relates to systems, methods, an apparatus, and/or code instructions (e.g., stored in a memory and executable by at least one hardware processor) for automatically generating labels for creating of a training dataset for training a classifier (sometimes referred to herein as an image classifier) for determining whether mask compliance is met or not for an input of a thermal image. For each subject, a sequence of thermal images of the respective subject wearing a mask, is obtained. The subject may be wearing the mask that meets the mask wearing compliance. Each respective sequence of thermal images is analyzed to identify a threshold thermal image of the sequence. The threshold thermal image may be identified based on earlier and later images. In thermal images prior to the threshold thermal image, an indication of an estimated temperature of a region of a face of the respective subject is increasing. In thermal images after the threshold thermal image, the indication of the estimated temperature of the region of the face of the respective subject reached a maximal value and remained constant thereafter (i.e., reached a plateau). Thermal images of the sequence prior to the threshold thermal image are automatically labelled with a label denoting lack of mask wearing compliance. Thermal images of the sequence after the threshold thermal image are automatically labelled with a label denoting proper mask wearing compliance. A training dataset that includes the labelled sequences of thermal images is created. The classifier is trained using the training dataset.

At least some implementations of the systems, methods, apparatus, and/or code instructions described herein address the technical problem of automated methods for monitoring mask wearing compliance by people, for example, that employees in a store that interact with customers are constantly wearing masks. Mask wearing during viral disease outbreaks, such as COVID-19, have been shown to reduce risk of both transmitting the virus to others, and to reduce risk of catching the virus from others. Masks wearing compliance may be poor, for example, due to discomfort from wearing the mask, such as in hot weather, due to anxiety generated by wearing the mask, and/or due to perceived difficulty in breathing (where no actual difficulty is present). Moreover, even in those that do wear masks, mask wearing compliance may not be proper, for example, the mask is not worn on the nose, which greatly reduces or completely negates the benefits of the mask when worn properly. In particular, mask wearing compliance may be intermediate, where the mask is constantly removed or placed in a non-beneficial position (e.g., below nose, below chin), and then placed back on the face, which reduced or negates the benefits of wearing the mask. In addition, the person wearing the mask may believe they are meeting mask wearing compliance, when in actuality, they are not meeting mask wearing compliance. The person may not intentionally be wearing the mask improperly (e.g., non-wearing, partial wearing), but appears to be properly wearing the mask. However, the mask may be defective, used improperly, and/or is no achieving its goal of protecting the wearer. For example, the mask may not properly seal the inhaling and/or exhaling area well. In such cases, the person wearing the mask may not be protected, and therefore is considered herein as not meeting proper mask wearing compliance. At least some implementations of the systems, methods, apparatus, and/or code instructions described herein are able to detect improper mask wearing compliance due to mask defects, improper wearing, improper sealing, and/or otherwise lack of protection being provided to the wearer. Moreover, the person may just put the mask on for the thermal image, in order to pass the mask wearing test. After the thermal image is taken and the person has passed the test, the mask may be removed. Simpler visible camera based methods which just analyze a visual image to detect whether the user is wearing the mask (e.g., based on shape, texture, color, and the like) may only detect the presence of the mask, without being able to fully determine mask wearing compliance. At least some implementations of the systems, methods, apparatus, and/or code instructions described herein are able to expose people that just put the mask on for the thermal image capture in order to pass the test (i.e., as improper mask wearing compliance), as compared to people that have been wearing the mask for at least the past few minutes (i.e., proper mask wearing compliance), which cannot be performed by standard visible light images captured by standard cameras, as described herein.

At least some implementations of the systems, methods, apparatus, and/or code instructions described herein improve the technical field of machine learning (ML) models and/or classifiers. In some embodiments, the improvement is in the ability to automatically generate a training dataset for detecting whether a person depicted in an image, optionally a single image, is compliant with mask wearing. The generated training dataset is used to train the classifier to determine whether the user has just put on the mask, or has been wearing the mask for a while, using at least a single image. The improvement is in the ability to automatically identify a threshold image where an indication of estimated temperature of a region of a face of the subject has reached a maximal value in a sequence of images of the subject. Images prior to the threshold image are automatically labelled with an indication of non-proper mask wearing compliance, i.e., the mask is improperly worn and/or the mask has not been worn for a sufficient amount of time. Images after the threshold image are automatically labeled with an indication of proper mask wearing compliance, i.e., the mask is properly worn and/or the mask has been worn properly for a sufficient amount of time.

At least some implementations of the systems, methods, apparatus, and/or code instructions described herein improve the technical field of automated remote health monitoring. People may be remotely monitored for proper mask wearing compliance using images captured by a thermal sensor.

At least some implementations of the systems, methods, apparatus, and/or code instructions described herein provide a solution to the above mention technical problem and/or improve the technical field of automated remote health monitoring, by analyzing an image captured by a thermal sensor, optionally a single image. The image is analyzed to identify an indication of estimated temperature of a region of a face of a subject depicted in the image wearing a mask, optionally the nose or portion thereof. Inventors discovered that when a person puts on a mask, the nose, which is typically colder than the upper face of the person, is heated by the warm air exhaled. The heating of the nose is slow, and takes some time, for example, over 20 seconds, or over 60 seconds, or over 120 seconds, or about 20-120 seconds, or about 60-120 seconds, for example, depending on the type of mask and/or ambient temperature. The temperature of the nose may reach a temperature similar or greater than the upper face (e.g., eyes, periorbital region, forehead). Even if the person in the image is depicted as wearing the mask, at least some implementations of the systems, methods, apparatus, and/or code instructions described herein enable analyzing the image to determine whether the mask has just been put on (e.g., indicating that that mask has just been put on for the image but is usually off), and/or that the mask is not worn properly, according to the estimated temperature of the nose.

Other solutions to detect mask wearing compliance are based on electrical contacts located on the mask that contact the skin, which requires specialized masks and/or complex equipment to interface with the electrical contacts. In contrast, at least some implementations of the systems, methods, apparatus, and/or code instructions described herein enable detecting mask wearing compliance remotely, using images which are remotely captured for remote and/or non-contact monitoring, without necessarily relying on additional components added to the mask (in some embodiments thermochromic elements are added to the mask, but the image is still remotely and non-contact obtained, providing remote monitoring capabilities).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
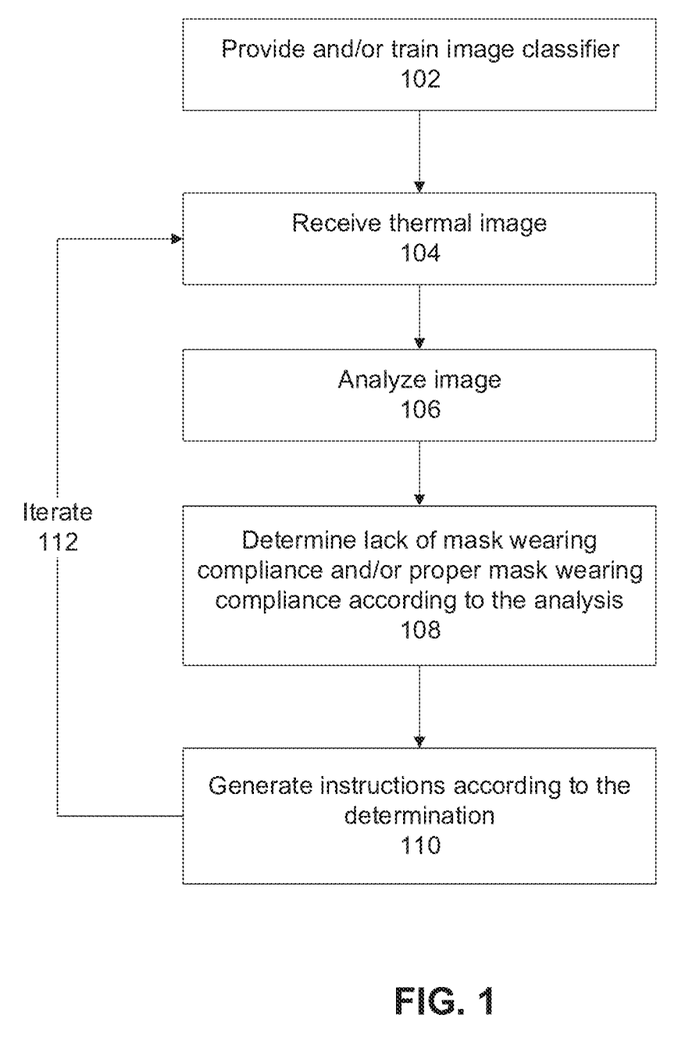
FIG. 1 is a flowchart of a method for analyzing a thermal image(s) for determining mask wearing compliance, in accordance with some embodiments of the present invention.
Figure 2:
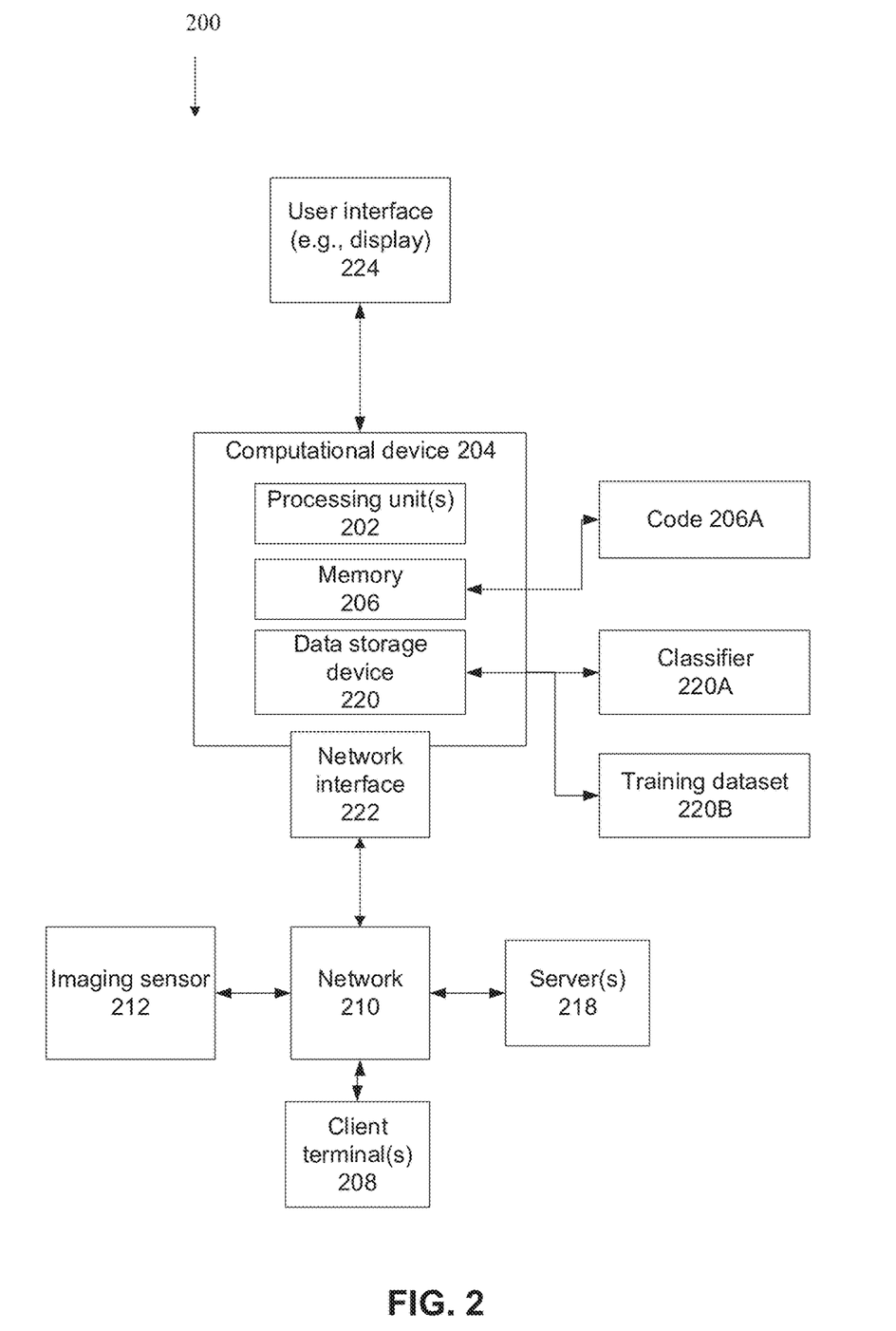
FIG. 2 is a block diagram of components of a system for analyzing a thermal image(s) for determining mask wearing compliance and/or automatically creating a training dataset for training a classifier for determining mask wearing compliance based on a thermal image, in accordance with some embodiments of the present invention.
Figure 3:
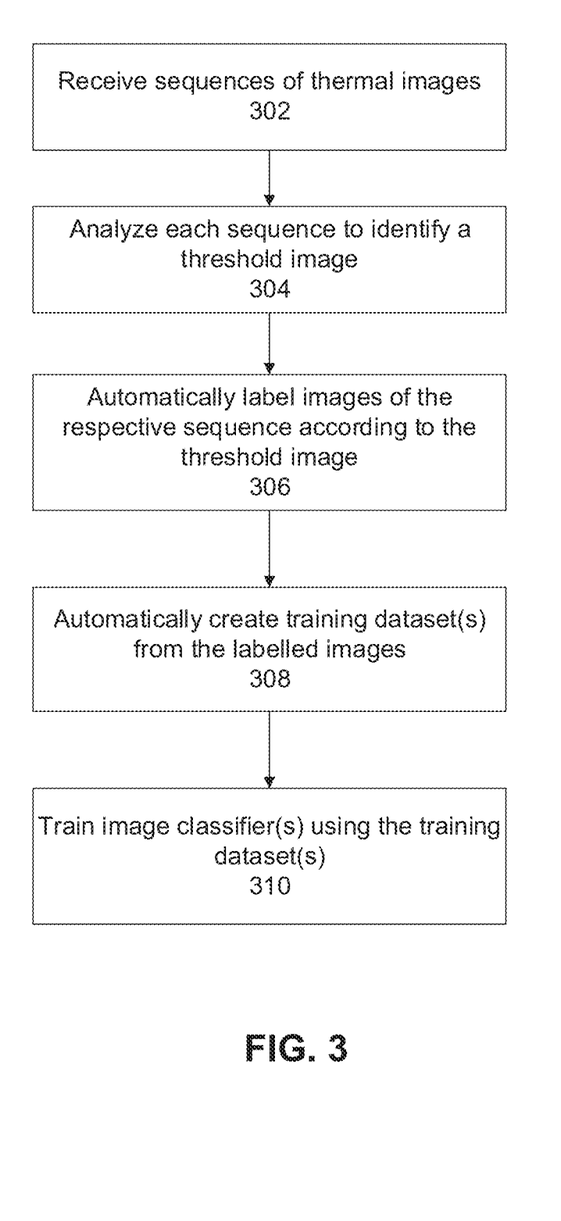
FIG. 3 is a flowchart of a method for automatic training of a classifier for determining mask wearing compliance in response to an input of thermal image(s), in accordance with some embodiments of the present invention.

Reference is now made to FIG. 1, which is a flowchart of a method for analyzing a thermal image(s) for determining mask wearing compliance, in accordance with some embodiments of the present invention. Reference is also made to FIG. 2, which is a block diagram of components of a system 200 for analyzing a thermal image(s) for determining mask wearing compliance and/or automatically creating a training dataset for training a classifier for determining mask wearing compliance based on a thermal image, in accordance with some embodiments of the present invention. Reference is also made to FIG. 3, which is a flowchart of a method for automatic training of a classifier for determining mask wearing compliance in response to an input of thermal image(s), in accordance with some embodiments of the present invention. The classifier described with reference to FIG. 3 may be automatically trained using an automatically generated training dataset, where thermal images are automatically labelled, providing an unsupervised approach that does not necessarily requiring manual labelling of the thermal images. System 200 may implement the features of the method described with reference to FIG. 1 and/or FIG. 3, by one or more hardware processors 202 of a computing device 204 executing code instructions stored in a memory (also referred to as a program store) 206.

Computing device 204 may be implemented as, for example, a client terminal, a server, a virtual machine, a virtual server, a computing cloud, a mobile device, a desktop computer, a thin client, a Smartphone, a Tablet computer, a laptop computer, a wearable computer, glasses computer, and a watch computer.

Multiple architectures of system 200 based on computing device 204 may be implemented. In an exemplary implementation, computing device 204 storing code 206A may be implemented as one or more servers (e.g., network server, web server, a computing cloud, a virtual server) that provides services (e.g., one or more of the acts described with reference to FIG. 1) to one or more servers 218 and/or client terminals 208 over a network 210, for example, providing software as a service (SaaS) to the servers 218 and/or client terminal(s) 208, providing software services accessible using a software interface (e.g., application programming interface (API), software development kit (SDK)), providing an application for local download to the servers 218 and/or client terminal(s) 208, and/or providing functions using a remote access session to the servers 218 and/or client terminal(s) 208, such as through a web browser and/or viewing application. For example, users use client terminals 208 to access computing device 204 to provide the thermal images and/or view results, such as detected non-compliance with mask wearing, and/or detected proper mask wearing compliance. People who are monitored by computing device 204 may be sent notifications and/or alerts to their client terminal 208 indicating proper mask wearing compliance and/or instructions for how to achieve proper mask wearing compliance when non-compliance is detected, for example, using an installed application and/or push-notifications. In another example, the analysis of images to detect mask wearing compliance (e.g., according to FIG. 1) may be performed by computing device 204, and training of classifier(s) (e.g., 220A, according to FIG. 3) may be performed by another device (e.g., server(s) 218). In another example, the analysis of the images and the training of classifiers may both be performed by computing device 204.

Computing device 204 receives thermal images captured by a sensor 212. Sensor 212 may be a thermal sensor capturing radiation that correlates with temperature, for example, in the long-infrared (IR) range of the electromagnetic spectrum (e.g., about 9000-14000 nanometers), InGaAs sensors, FPA sensors, and the like. Alternatively or additionally, sensor 212 may be a non-thermal sensor capturing radiation that does not necessarily correlate with temperature. In such a case, the image may depict thermochromic elements that do change (e.g., color, pattern) and correlate with temperature. Examples of non-thermal sensors include short-wave infrared (SWIR) sensors, near infrared (NIR) sensors, and standard visible light sensors (e.g., CCD and/or CMOS sensors), and/or red green blue (RGB) sensors. Thermal images may be captured in real time, for real time analysis for real time detection of mask wearing compliance. Alternatively or additional, one or a sequence of thermal images may be captured for training classifier(s) 220A, as described herein. Sensor 212 may transmit captured images to computing device 204, for example, via a direct connected (e.g., local bus and/or cable connection and/or short range wireless connection), and/or via a network 210 and a network interface 222 of computing device 204 (e.g., where sensors are connected via internet of things (IoT) technology and/or are located remotely from the computing device).

Network interface 222 may be implemented as, for example, a wire connection (e.g., physical port), a wireless connection (e.g., antenna), a network interface card, a wireless interface to connect to a wireless network, a physical interface for connecting to a cable for network connectivity, and/or virtual interfaces (e.g., software interface, application programming interface (API), software development kit (SDK), virtual network connection, a virtual interface implemented in software, network communication software providing higher layers of network connectivity).

Memory 206 stores code instructions executable by hardware processor(s) 202. Exemplary memories 206 include a random access memory (RAM), read-only memory (ROM), a storage device, non-volatile memory, magnetic media, semiconductor memory devices, hard drive, removable storage, and optical media (e.g., DVD, CD-ROM). For example, memory 206 may code 206A that execute one or more acts of the method described with reference to FIG. 1 and/or FIG. 3.

Computing device 204 may include data storage device 220 for storing data, for example, classifier(s) 220A and/or training dataset(s) 220B, as described herein. Data storage device 220 may be implemented as, for example, a memory, a local hard-drive, a removable storage unit, an optical disk, a storage device, a virtual memory and/or as a remote server 218 and/or computing cloud (e.g., accessed over network 210). It is noted that classifier(s) 220A and/or training dataset(s) 220B may be stored in data storage device 220, for example, with executing portions loaded into memory 206 for execution by processor(s) 202.

Computing device 204 and/or client terminal(s) 208 and/or server(s) 218 include and/or are in communication with one or more physical user interfaces 224 that include a mechanism for implementing the generated instructions, for example, a display for presenting a video on how to properly wear a mask, and/or for presenting a push-notification, and/or speakers for playing an audio reminder to wear the mask. User interface 224 may include a mechanism for inputting data. Exemplary user interfaces 224 include, for example, one or more of, a touchscreen, a display, a keyboard, a mouse, and voice activated software using speakers and microphone.

Referring now back to FIG. 1, at 102, a classifier (sometimes referred to herein as an image classifier) may be trained and/or provided. The classifier is trained to provide an outcome of mask wearing compliance in response to an input of one or more thermal images depicting a face of a person. The classifier may output, for example, a single classification category (e.g., proper mask wearing compliance), a binary classification category (e.g., proper mask wearing compliance, or lack of mask wearing compliance), and/or a numerical value indicative of accuracy of proper mask wearing compliance, for example, a probability value between 0-1 indicative of likelihood of proper mask wearing compliance.

The classifier may be trained a training dataset including, for each of multiple subjects, one or more (e.g., sequence) of images of the respective subject wearing a mask, and a corresponding label denoting proper mask wearing compliance or lack of mask wearing compliance.

An exemplary process for training an exemplary classifier is described with reference to FIG. 3.

Optionally, one or more classifiers are trained and/or provided, for example, trained to detect proper mask wearing compliance for a certain type of mask. In one example, code first analyzes the image to detect the mask type, and the classifier trained to detect mask wearing compliance for a certain type of mask is selected according to the determined type of mask. In another example, a single classifier is trained using images depicting multiple mask types. The classifier determines mask wearing compliance for many different types of masks.

Exemplary classifier implementations include: one or more or combination of: neural networks of various architectures (e.g., fully connected, deep, encoder-decoder), support vector machines (SVM), logistic regression, k-nearest neighbor, decision trees, boosting, random forest, and the like.

Alternatively or additionally, other analysis code is provided, for example, a set of rules and/or other approaches as described herein.

At 104, one or more thermal images of a subject captured by a sensor are received. The sensor may be a thermal sensor and/or a non-thermal sensor. The images may be received as a sequence, for example, a video captured by the thermal sensor.

The thermal images depict differences in temperature therein. For example, pixel intensity values of the thermal image represent temperature of the corresponding region depicted in the thermal image.

The thermal images may be thermograms captured by a thermal sensor. The thermal sensor may be implemented, for example, as sensors capturing radiation in the long-infrared range of the electromagnetic spectrum (e.g., about 9000-14000 nanometers), InGaAs sensors, FPA sensors, and the like. Alternatively or additionally, the thermal images may be non-thermogram images captured by a non-thermal sensor. Thermal images captured by the non-thermal sensor may depict thermochromic elements therein. The thermochromic elements themselves are sensitive to temperature and change a thermochromic property, for example, color and/or pattern, according to temperature. Examples of non-thermal sensors include short-wave infrared (SWIR), near infrared (NIR) sensors, and standard visible light sensors (e.g., CCD and/or CMOS sensors).

At 106, the image is analyzed using one or more approaches.

Optionally, the image is analyzed to identify an indication of estimated temperature of a region of a face of the subject. The indication of estimated temperature may be another value serving as a proxy that correlates with temperature, rather than a measurement of temperature, for example, pixel intensity values that correlate to temperature may be used as the indication of estimated temperature. The temperature itself does not need to necessarily be measured, rather, the pixel intensity values of the thermal images that correlate with temperature may be used.

As described in additional detail in the "Examples" section below, Inventor conducted experiments, and observed that the estimated temperature of the region of the face increases when the person is wearing a mask, based on the hypothesis that the exhaled air trapped by the mask and directed to a small region of the face heats up that region of the face.

The region of the face for which temperature is measured using the thermal image for detecting mask wearing compliance may be, for example, the nose, tip region of the nose, lips, philtrum, mentolabial sulcus, upper cheeks below the eyes, sides of the mask, and/or lower portion of the mask. It is noted that the region of the face may be located underneath the mask, and/or the region of the face may be defined by the mask itself.

Alternatively or additionally, the image is analyzed by being inputted into the classifier. An indication of lack (or proper) mask wearing compliance is an outcome of the classifier.

Optionally, the image is segmented to obtain the region of the face of the subject. Optionally, one or more regions are segmented, for example, the nose, nostrils, lip area, philtrum, mentolabial sulcus, mouth region, lower cheeks. The segmented regions may be located underneath the mask, in which case the segmentation is of the mask depicting contours of the face below. Alternatively, both the mask and facial features below are depicted in certain images captured by certain sensors that are capable of capturing images behind a barrier, for example, SWIR. The segmentation may be performed, for example, by segmentation code, for example, a neural network trained to perform the segmentation. The neural network may be trained on a training dataset of images labelled with segmented facial regions of subjects. The segmented region is analyzed to identify the estimated temperature within the segmented region.

Optionally, the estimated temperature is determined by comprises computing an aggregated intensity level of pixels for the image, optionally, for the one or more segmented regions of the face. The aggregate intensity level may be computed, for example, as an average of intensity of pixels depicting the region of the face, an area (e.g., number of pixels, dimensions of an area of pixels) where the pixel intensity level fall within a common range (e.g., a circle of diameter 25 pixels where pixels of the circle have an intensity between 75-95), a histogram of bins where each bin corresponds to a certain pixel intensity range and a height of a bar of the respective bin corresponds to number of pixels within the respective bin, and the like. The temperature threshold (e.g., as described with reference to 108) is set according to the implementation of the aggregated intensity level. For example, when the aggregated intensity level is an average of the pixel intensity values, the temperature threshold is a pixel intensity level threshold. Optionally, the estimated temperature is computed for each segmented region, and the temperature threshold is set for each segmented region.

Optionally, the image is analyzed to identify at least one mask parameter. An exemplary mask parameter include a type of mask, for example, surgical mask, N95 mask, face shield, scarf, and cloth mask, mask thickness, presence of mask valves. The mask parameter (e.g., type of mask) may be identified, for example, by code such as a mask classifier. The mask classifier may be trained on a training dataset of images of people wearing different masks, labelled with the type of mask depicted in the image. In another example, the type of mask may be identified, for example by other imaging processing code, for example, the identifies a distinguishing feature of the mask, for example, the outline of a face shield, a valve, and unique shape of the N95 mask.

Optionally, the estimated temperate of the region of the face and/or the region of the face which is analyzed may be determined according to the type of mask. For example, different masks may achieve different heating effects, resulting in different parts of the face heating up to different temperatures.

Optionally, the image analysis process (e.g., image classifier) is selected according to the mask parameter, from multiple image analysis processes each designed to process a different mask parameter. Alternatively, the same single image analysis process is designed to process multiple types of mask parameters.

Optionally, the image is analyzed for identifying one or more thermochromic elements on the mask. The mask may be, for example, made of thermochromic elements, the thermochromic elements may be integrated into the mask, and/or the thermochromic elements may be attached to the mask. Thermochromic elements may be, for example, regions of thermochromic ink, thermochromic plastic elements, thermochromic polymer elements, thermochromic paper and/or cloth and the like. Thermochromic elements may be identified, for example, by segmentation code, by code that identifies visual features of the thermochromic elements, and/or by a thermochromic classifier trained on a training dataset of labelled thermochromic elements in images. One or more thermochromic parameters of the thermochromic element are identified, for example, color and/or patterns of the thermochromic element. Pixels corresponding to the identified thermochromic elements may be analyzed, for example, pixel intensity and/or aggregated (e.g., average) pixel intensity of the thermochromic elements. The indication of estimated temperature is identified according to the thermochromic parameter, for example, by code that maps values of the thermochromic parameter to estimated temperatures (e.g., set of rules, mapping dataset, trained classifier). For example, different colors of the thermochromic parameter may correspond to different temperatures. It is noted that when using thermochromic elements, the sensor may not necessarily be implemented as a thermal sensor, but may be implemented using other approaches, for example, a standard visual light sensor, and/or a sensor that captures radiation at other wavelengths not necessarily depicting temperature. The term thermal image used herein may refer to such images depicting thermochromic elements captured by thermal and/or non-thermal sensors.

Optionally, the image is analyzed for identifying a distribution of temperature under the mask. Improper wearing of the mask may result in a certain temperature distribution (e.g., increased cooling at entry/exit points below the mask), while proper wearing of the mask may result in a different temperature distribution (e.g., even heating). The distribution may be analyzed to detect lack of mask wearing compliance and/or proper mask wearing compliance. For example, the distribution of measured temperature may be compared to a template distribution indicating lack of compliance, and/or a template distribution indicating compliance. Other analyzing methods may be used, for example, a set of rules, and/or a trained distribution classifier.

At 108, lack of mask wearing compliance and/or proper mask wearing compliance is determined based on the analysis.

Optionally, the computed estimated temperature is compared to a temperature threshold. Lack of mask wearing compliance is detected when the estimated temperature is below the temperature threshold. Alternatively, proper mask wearing compliance is detected when the estimated temperature is above the temperature threshold.

The temperature threshold may be, for example, a predefined value (e.g., empirically measured using a thermometer, set as a default value), a value determined by an analysis of images of other persons wearing masks, and/or dynamically computed for the person using the image of the person.

Optionally, the temperature threshold is dynamically computed, based on a reference region of the face of depicted in the image, which is different than the region of the face for which the estimated temperature is computed for. The temperature threshold may be defined by computed the aggregated intensity level of pixels depicting the reference region of the face, optionally using the same aggregation process used to compute the estimated temperature. For example, the estimated temperature is computed for the region of the face including the nose or portion thereof, and the temperature threshold is computed for the reference region of the face including an upper region of the face or portion thereof. In such a case, lack of mask wearing compliance is determined when the estimated temperature of the nose or portion thereof is less than the temperature threshold defined as the estimated temperature of the upper region of the face of portion thereof. Proper mask wearing compliance is determined when the estimated temperature of the nose or portion thereof is greater than the temperature threshold defined as the estimated temperature of the upper region of the face of portion thereof.

Optionally, images are analyzed over time to predict whether and/or when the estimated temperature of the region of the face will reach the temperature threshold or remain below the temperature threshold. The analysis over time may determine, for example, whether the person just put the mask on (correctly) and will reach the temperature threshold in the near future, indicating proper mask wearing compliance. In another example, the analysis may determine whether the person who is wearing the mask (incorrectly, such as only over the mouth but not over the nose) will not reach the temperature threshold in the future, indicating lack of mask wearing compliance. The following is an exemplary process for analyzing images over time to predict whether and/or when the temperature of the region of the face will reach the temperature threshold: A sequence of images is received, where each image may be time stamped and/or sequentially identified. Each image of the sequence of images is analyzed to identify a respective indication of estimated temperature, as described herein. The multiple sequential indications of estimated temperature of the sequence of images are analyzed to detect an increasing trend in the estimated temperature, for example, by plotting a line, such as a best fit line, and/or using linear regression. The trend may be extrapolated, for example, by extending the computed line to a time beyond the last analyzed image. The extrapolated trend may be analyzed for predicting whether the increasing trend will increase above the temperature threshold, or whether the trend is predicted to remain below the temperature threshold. Proper mask wearing compliance may be determined in response to the extrapolated trend increasing above the temperature threshold. Lack of mask wearing compliance may be determined in response to the extrapolated trend remaining below the temperature threshold.

Alternatively, or additionally, an amount of time the subject wore the mask is estimated according to the indication of estimated temperature. The temperature threshold may represent a dynamic mapping between computed estimated temperature and amount of time the mask has been worn. Inventors observed that when the person wears the mask correctly, the region of the face heats up over time. When the person has not worn the mask properly, for example, repeatedly adjusting their mask to an improper mask compliance position (e.g., place below the nose or below chin), the time that the mask has been properly worn is "reset" after each adjustment. The estimated temperature may therefore indicate the amount of time that the mask has been worn correctly and/or incorrectly. The instructions may be generated according to whether lack of mask wearing compliance is detected or whether proper mask wearing compliance is detected, and according to the estimated time that the mask has been worn.

The relationship (e.g., mapping) between estimated temperature and time may be implemented using a data structure, for example, a mapping between estimated temperature values and time values, a function that given the estimated temperature computes the time, a classifier, and the like. In another implementation, the estimated amount of time is computed based on calibration code (e.g., time classifier) that maps the indication of estimated temperature to estimated amount of time from initial wearing of the mask. The calibration code may be trained according to a training dataset that includes sequence(s) of images of one or more subjects wearing a respective mask, where each image associated with a timestamp indicating time from initial wearing of the mask and associated indication of estimated temperature.

At 110, instructions may be generated in response to the detected lack of mask wearing compliance or in response to the detected proper mask wearing compliance.

Optionally, in response to the detected lack of mask wearing compliance, the instructions are generated, for example, in an effort to meet proper mask wearing compliance. Exemplary instructions include one or more of:

(i) generating an alert signal, for example, a red light flashes.

(ii) playing a video on a display showing show to properly put on and wear a mask for mask wearing compliance.

(iii) an audio message playing over speakers stating that the mask should be placed on the nose and mouth.

(iv) a pop-up message presented on a display, for example, stating to put the mask on the nose and mouth.

Alternatively, in response to the detected proper mask wearing compliance, the instructions are generated, for example, in an effort to encourage the maintenance of proper mask wearing compliance. Exemplary instructions include one or more of:

(i) generating a positive signal, for example, a green light flashes.

(ii) playing a video on a display congratulating the person for wearing the mask properly.

(iii) an audio message playing over speakers stating that the mask should continue to be worn as is currently being done.

(iv) a pop-up message presented on a display, for example, a happy face.

Alternatively, the instructions may be for automatic opening/revolving of a door, for example, for execution by a controller of the door (e.g., implemented as one possibility of server 218 in FIG. 2). When the person depicted in the image is determined to be meeting proper mask wearing compliance, the door may be automatically opened to let the person in (e.g., to the building, on a plane, into a subway). When the person depicted in the image is determined to not be meeting proper mask wearing compliance, the door may not be automatically opened, i.e., remain closed. The user may attempt to enter by being re-imaged in another iteration after putting the mask on properly.

Optionally, when the estimated amount of time that the mask has been worn is estimated, the generated instruction may further indicate the amount of estimated amount of time that the mask has been worn, and/or that the mask should not be taken on and off and/or adjusted, but be kept on constantly.

Optionally, when the estimated temperature is below the temperature threshold, it may be indicative that the person has just put the mask on, even when the mask is worn properly. Optionally, the distinction of whether the user is properly wearing the mask but has not put it on for a sufficiently long period of time, or is not properly wearing the mask, may be detected, for example, by code that analyzes the image to determine whether the mask is covering the nose and mouth (e.g., classifier trained on a training dataset of labelled images of users properly wearing masks and not properly wearing masks, and/or images and/or feature detection code that finds features of the mask and nose/mouth). In such a case, the instructions may include a message to maintain wearing of the mask. The user may be retested after an estimated remaining time has elapsed to check that the estimated temperature is above the threshold. Alternatively, such distinction is not made. The instructions may include a generic message to properly wear a mask and keep it on.

At 112, one or more features described with reference to 104-110 may be iterated, for example, for continuous monitoring of mask wearing compliance. In another example, when lack of mask wearing compliance is detected in a first iteration, another iteration(s) may be performed until mask wearing compliance is met, for example, in an attempt to trigger automatic opening of a door as described herein.

Referring now back to FIG. 3, at 302, for each subject of multiple subjects, a respective sequence of thermal images of the respective subject wearing a mask properly according to the mask wearing compliance, are obtained over a time interval by the sensor, for example, as a video.

At 304, each sequence of images may be analyzed to identify a threshold image of the sequence.

Optionally, each respective image is analyzed using analysis code that segments the region of the face of the respective subject depicted in the respective image, and computes the indication of the estimated temperature as an aggregation of pixel intensity values of pixels within the segmented region, for example, as described with reference to 106 of FIG. 1.

The threshold image may be identified as follows. The respective sequence of images is analyzed to determine a pattern of the indication of estimated temperature of the region of the face of the subject increasing, followed by a plateau at a maximal estimated temperature. For images prior to the threshold image, the indication of the estimated temperature of the region of the face of the respective subject is increasing. In images after the threshold image, the indication of the estimated temperature of the region of the face of the respective subject reached a maximal value and remained constant thereafter.

Alternatively or additionally, the threshold image is identified according to the indication of the estimated temperature of the region of the face of the respective subject being equal to an indication of the estimated temperature of a reference region of the face of the respective subject. In images prior to the threshold image, the indication of the estimated temperature of the region of the face of the respective subject is below the reference region. In images after the threshold image, the indication of the estimated temperature of the region of the face of the respective subject is equal to or greater than the reference region.

At 306, images of the respective sequence are automatically labelled according to the threshold image. Images of the respective sequence prior to the threshold image are automatically labelled with a label denoting lack of mask wearing compliance. Images of the sequence after the threshold image are automatically labelled with a label denoting proper mask wearing compliance.

At 308, a training dataset is automatically created from the automatically labelled images. The training dataset includes, for each of the subjects, the respective sequence of images with corresponding labels denoting lack of mask wearing compliance or proper mask wearing compliance.

Optionally, the training dataset includes images depicting subjects wearing different masks having different mask parameters. In such implementation, the trained classifier may analyze images depicting people wearing different masks of different mask parameters. Alternatively, multiple training datasets are created, where each respective training dataset includes images of subjects wearing one type of mask having one type of mask parameter. In such implementation, multiple classifiers are trained, where one classifier is selected according to the identified mask and/or mask parameter depicted in the image.

At 310, one or more image classifiers are trained using the training dataset(s).

Various embodiments and/or implementations of at least some of the systems, methods, apparatus, and/or code instructions described hereinabove and as claimed in the claims section below find experimental support in the following examples.

Examples

Reference is now made to the following examples, which together with the above descriptions illustrate some embodiments and/or implementations of at least some of the systems, methods, apparatus, and/or code instructions described herein in a non limiting fashion.

Inventor conducted experiments, and observed that for a person wearing a mask according to the mask wearing compliance (i.e., mask covers nose and mouth), the estimated temperature computed from thermal images of a target region, e.g., the nose, in particular the tip of the nose region, when located behind the mask worn by the person, increases over time, until a maximal temperature plateau is reached.

The estimated temperature may be computed by a proxy of an average value of pixel intensities (i.e., gray levels) within the target region, e.g., tip of nose region. The temperature itself does not need to necessarily be measured, rather, the pixel intensity values of the thermal images that correlate with temperature may be used.

Figure 4:
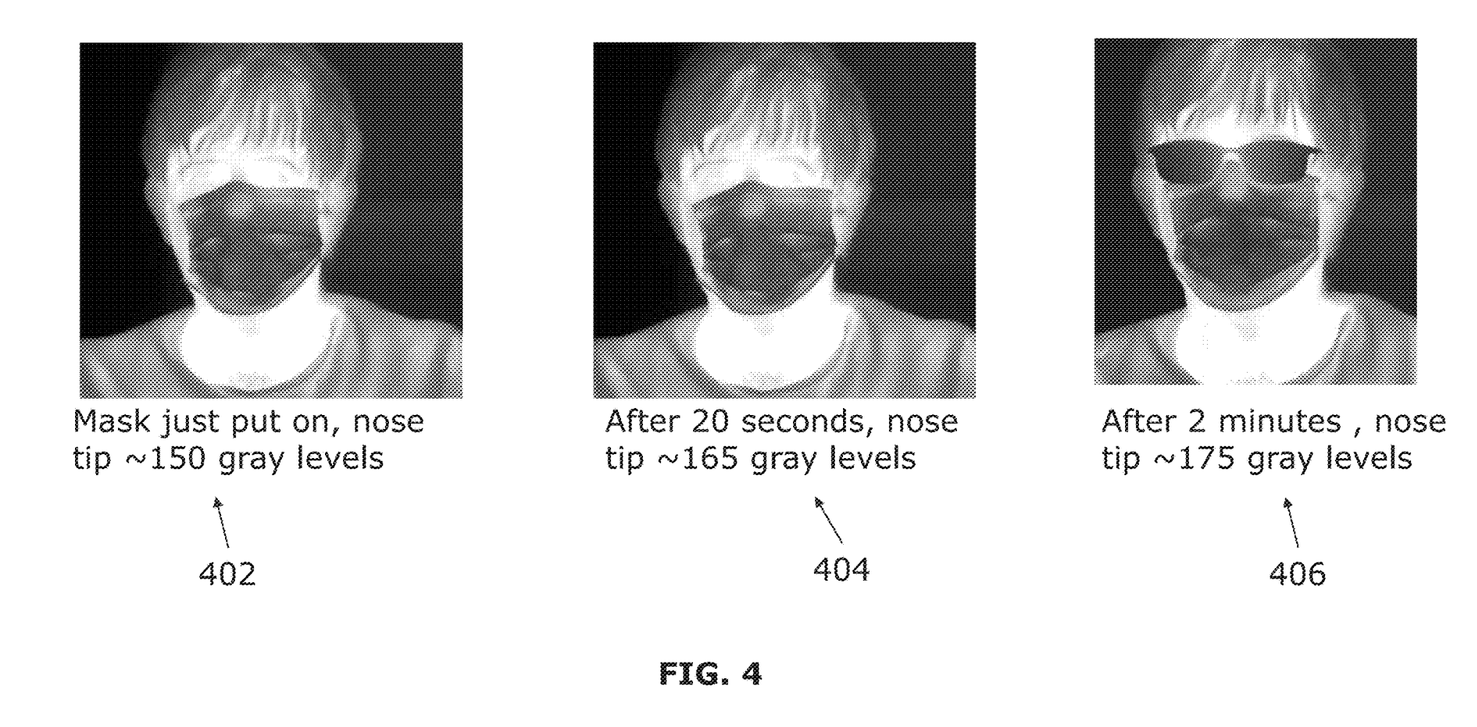
FIG. 4 is a sequence of thermal images captured by a thermal sensor, depicting an increasing trend of an average of pixel intensity values of a target region, in accordance with some embodiments of the present invention.

Reference is now made to FIG. 4, which is a sequence of thermal images 402, 404, 406, captured by a thermal sensor, depicting an increasing trend of an average of pixel intensity values of a target region, in accordance with some embodiments of the present invention. The average pixel intensity values of the thermal images 402, 404, 406, correlate with temperature, such that the increasing trend of the average pixel intensity values for the nose tip region is indicative of an increasing temperature of the nose region.

Thermal image 402 is captured right after the subject has put the mask on, denoted as time of zero seconds. The mask is worn according to proper mask wearing compliance, covering the nose and mouth. The average of the pixel intensity values (i.e., gray level) for the nose tip region is about 150.

Thermal image 404 is captured after about 20 seconds. The average of the pixel intensity values (i.e., gray level) for the nose tip region has increased to about 165, indicative of an increasing temperature of the nose tip region.

Thermal image 406 is captured after about 2 minutes. The average of the pixel intensity values (i.e., gray level) for the nose tip region has increased to about 175, which denotes the maximal and plateau value, indicative that the maximal temperature of the nose tip region is reached.

The results of the experiment may be used to create a classifier and/or calibration code and/or other analysis code to detect whether mask compliance is met, and/or how long the user has been wearing the mask for. For example, an average pixel intensity value of 150 computed for a nose tip region in a newly received image indicates that mask compliance is not met and/or that the user has not been wearing the mask long enough. In another example, an average pixel intensity value of 176 computed for a nose tip region in a newly received image indicates that mask compliance is met.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant thermal images and sensors will be developed and the scope of the terms image and sensor are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method for analyzing a thermal image for enforcing mask wearing compliance, comprising:
   receiving a thermal image of a subject captured by a sensor;
   analyzing the thermal image to identify an indication of estimated temperature of a region of a face of the subject;
   in response to the estimated temperature being below a temperature threshold, detecting lack of mask wearing compliance; and
   generating instructions for meeting proper mask wearing compliance;
   wherein analyzing the thermal image to identify the estimated temperature comprises obtaining an aggregated intensity level of pixels depicting the region of the face;
   wherein the aggregated intensity level is computed as an average of intensity of pixels depicting the region of the face, and the temperature threshold comprises a pixel intensity level threshold.

2. The method of claim 1, wherein analyzing the thermal image to identify the estimated temperature comprises comparing an aggregated intensity level of pixels depicting the region of the face to a reference region of the face, and the temperature threshold is defined by the aggregated intensity level of pixels depicting the reference region of the face.

3. The method of claim 1, wherein analyzing the thermal image comprises:
   analyzing the thermal image to identify at least one mask parameter;
   wherein the estimated temperature of the region of the face is determined according to a thermal image analysis process selected from a plurality of thermal image analysis processes based on the identified at least one mask parameter.

4. The method of claim 3, wherein analyzing the thermal image to identify the estimated temperature comprises obtaining an aggregated intensity level of pixels depicting the region of the face.

5. The method of claim 1, wherein analyzing the thermal image comprises segmenting the region of the face of the subject from the thermal image, and identify comprises identifying the estimated temperature from the segmented region.

6. The method of claim 1, wherein the thermal image is one of a sequence of thermal images, wherein each thermal image of the sequence of thermal images is analyzed to identify a respective indication of estimated temperature, and further comprising:
   analyzing a plurality of indications of estimated temperature of the sequence of thermal images to detect an increasing trend in the estimated temperature;
   extrapolating the increasing trend;
   analyzing the extrapolated increasing trend for predicting that the increasing trend will increase above the temperature threshold; and
   wherein generating instructions comprises generating instructions for maintaining wearing the mask for meeting mask wearing compliance.

7. The method of claim 1, wherein the thermal image is one of a sequence of thermal images, wherein each thermal image of the sequence of thermal images is analyzed to identify a respective indication of estimated temperature, and further comprising:
   analyzing a plurality of indications of estimated temperature of the sequence of thermal images to detect an increasing trend in the estimated temperature;
   extrapolating the increasing trend;
   analyzing the extrapolated increasing trend for predicting that the increasing trend will remain below the temperature threshold; and
   wherein generating instructions comprises generating instructions for adjusting the mask for meeting mask wearing compliance.

8. The method of claim 1, wherein generating instructions comprises at least one of: (i) playing a video on a display showing show to properly put on and wear a mask for mask wearing compliance (ii) an audio message playing over speakers stating that the mask is to be worn on the nose and mouth, (iii) a pop-up message presented on a display indicating that the mask is to be worn on the nose and mouth, and (iv) instructions to a controller of an automated door to keep the door closed to prevent entry until mask wearing compliance is met, when mask compliance is met the instructions to the controller are to automatically open the door to allow entry.

9. The method of claim 1, wherein analyzing the thermal image comprises identifying at least one thermochromic element on the mask, identifying at least one thermochromic parameter of the thermochromic element, and identifying the indication of estimated temperature according to the at least one thermochromic parameter.

10. A computer implemented method for analyzing a thermal image for enforcing mask wearing compliance, comprising:
    receiving a thermal image of a subject captured by a sensor;
    analyzing the thermal image to identify an indication of estimated temperature of a region of a face of the subject;
    in response to the estimated temperature being below a temperature threshold, detecting lack of mask wearing compliance; and
    generating instructions for meeting proper mask wearing compliance;
    wherein analyzing the thermal image to identify the estimated temperature comprises comparing an aggregated intensity level of pixels depicting the region of the face to a reference region of the face, and the temperature threshold is defined by the aggregated intensity level of pixels depicting the reference region of the face;
    wherein the region of the face comprises the nose or portion thereof and the reference region of the face comprises an upper region of the face or portion thereof.

11. A computer implemented method for analyzing a thermal image for enforcing mask wearing compliance, comprising:
    receiving a thermal image of a subject captured by a sensor;
    analyzing the thermal image to identify an indication of estimated temperature of a region of a face of the subject;

in response to the estimated temperature being below a temperature threshold, detecting lack of mask wearing compliance; and generating instructions for meeting proper mask wearing compliance;

wherein analyzing the thermal image comprises:

analyzing the thermal image to identify at least one mask parameter;

wherein the estimated temperature of the region of the face is determined according to a thermal image analysis process selected from a plurality of thermal image analysis processes based on the identified at least one mask parameter;

wherein at least one mask parameter is selected from the group consisting of: surgical mask, N95 mask, face shield, scarf, and cloth mask, mask thickness, presence of mask valves.

12. A computer implemented method for analyzing a thermal image for enforcing mask wearing compliance, comprising:

receiving a thermal image of a subject captured by a sensor;

analyzing the thermal image to identify an indication of estimated temperature of a region of a face of the subject;

in response to the estimated temperature being below a temperature threshold, detecting lack of mask wearing compliance; and generating instructions for meeting proper mask wearing compliance;

wherein analyzing comprises inputting the thermal image into a classifier, wherein the detecting lack of mask wearing compliance is an outcome of the classifier, wherein the classifier is trained on a training dataset including, for each of a plurality of subjects, at least one thermal image of the respective subject wearing a mask, and a corresponding label denoting proper mask wearing compliance or lack of mask wearing compliance.

13. The method of claim 12, wherein the label denoting proper mask wearing compliance or lack of mask wearing compliance is automatically assigned by:

analyzing a sequence of thermal images of the respective subject obtained over a time interval;

analyzing the sequence of thermal images to determine a pattern of the indication of estimated temperature of the region of the face of the subject increasing, followed by a plateau at a maximal estimated temperature;

identifying a threshold thermal image of the sequence, where in thermal images prior to the threshold thermal image the estimated temperature is increasing, and in thermal images after the threshold thermal image the estimated temperature reached a maximal value and remained constant thereafter;

labelling thermal images of the sequence prior to the threshold thermal image with a label denoting lack of mask wearing compliance, and labelling thermal images of the sequence after the threshold thermal image with a label denoting proper mask wearing compliance.

14. The method of claim 13, wherein the training dataset includes thermal images depicting a plurality of subjects wearing a plurality of masks having a plurality of mask parameters.

15. A computer implemented method for analyzing a thermal image for enforcing mask wearing compliance, comprising:

receiving a thermal image of a subject captured by a sensor;

analyzing the thermal image to identify an indication of estimated temperature of a region of a face of the subject;

in response to the estimated temperature being below a temperature threshold, detecting lack of mask wearing compliance;

generating instructions for meeting proper mask wearing compliance; and estimating an amount of time the subject wore the mask according to the indication of estimated temperature, and when the lack of mask wearing compliance is detected, generating instructions comprises generating instructions indicating that the mask has been work for the estimated amount of time and should be kept on constantly.

16. A computer implemented method for analyzing a thermal image for enforcing mask wearing compliance, comprising:

receiving a thermal image of a subject captured by a sensor;

analyzing the thermal image to identify an indication of estimated temperature of a region of a face of the subject;

in response to the estimated temperature being below a temperature threshold, detecting lack of mask wearing compliance; and generating instructions for meeting proper mask wearing compliance;

wherein the estimated amount of time is computed based on calibration code that maps the indication of estimated temperature to estimated amount of time from initial wearing of the mask, the calibration code trained according to a sequence of thermal images of at least one subject wearing a mask, each thermal image associated with a timestamp indicating time from initial wearing of the mask and associated indication of estimated temperature.

17. A computer implemented method for automatic training of a classifier for determining mask wearing compliance based on a thermal image, comprising:

obtaining, for each of a plurality of subjects, a sequence of thermal images of the respective subject wearing a mask, obtained over a time interval;

for each sequence of thermal images, analyzing the respective sequence of thermal images to identify a threshold thermal image of the sequence, where in thermal images prior to the threshold thermal image an indication of an estimated temperature of a region of a face of the respective subject is increasing, and in thermal images after the threshold thermal image the indication of the estimated temperature of the region of the face of the respective subject reached a maximal value and remained constant thereafter;

labelling thermal images of the sequence prior to the threshold thermal image with a label denoting lack of mask wearing compliance, and labelling thermal images of the sequence after the threshold thermal image with a label denoting proper mask wearing compliance;

creating a training dataset including, for each of the plurality of subjects, the sequence of thermal images with corresponding labels denoting lack of mask wearing compliance or proper mask wearing compliance; and training a classifier using the training dataset.

18. The method of claim 17, wherein each respective thermal image is analyzed using analysis code that segments the region of the face of the respective subject depicted in the respective thermal image, and computes the indication of the estimated temperature as an aggregation of pixel intensity values of pixels within the segmented region.

19. The method of claim 17, wherein the threshold thermal image is identified according to the indication of the estimated temperature of the region of the face of the respective subject being equal to an indication of the estimated temperature of a reference region of the face of the respective subject, wherein in thermal images prior to the threshold thermal image the indication of the estimated temperature of the region of the face of the respective subject is below the reference region, and in thermal images after the threshold thermal image the indication of the estimated temperature of the region of the face of the respective subject is equal to or greater than the reference region.

* * * * *